United States Patent
Kim et al.

(10) Patent No.: US 10,120,254 B2
(45) Date of Patent: Nov. 6, 2018

(54) LIQUID CRYSTAL DISPLAY WITH INCREASED APERTURE RATIO

(71) Applicant: Samsung Display Co., Ltd., Yongin-si (KR)

(72) Inventors: Hoon Kim, Ansan-si (KR); Hyun Joon Kim, Yongin-si (KR); Ki Chul Shin, Seongnam-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 256 days.

(21) Appl. No.: 14/934,931

(22) Filed: Nov. 6, 2015

(65) Prior Publication Data

US 2016/0313594 A1  Oct. 27, 2016

(30) Foreign Application Priority Data

Apr. 23, 2015 (KR) .................. 10-2015-0057296

(51) Int. Cl.
*G02F 1/1362* (2006.01)
*G02F 1/1343* (2006.01)

(52) U.S. Cl.
CPC ............ *G02F 1/13624* (2013.01); *G02F 2001/134345* (2013.01)

(58) Field of Classification Search
None
See application file for complete search history.

(56) References Cited

U.S. PATENT DOCUMENTS

| | | | |
|---|---|---|---|
| 8,810,745 B2 | 8/2014 | Kim et al. | |
| 2012/0105785 A1* | 5/2012 | Kim | G09G 3/3648 349/139 |
| 2013/0135572 A1* | 5/2013 | Park | G02F 1/134336 349/143 |
| 2015/0055049 A1* | 2/2015 | Kwon | G02F 1/133707 349/46 |
| 2015/0236046 A1* | 8/2015 | Park | H01L 27/124 257/72 |
| 2016/0299397 A1* | 10/2016 | Jung | H01L 27/1222 |

FOREIGN PATENT DOCUMENTS

| | | |
|---|---|---|
| KR | 1020130034700 | 4/2013 |
| KR | 1020140000459 | 1/2014 |
| KR | 1020140097905 | 8/2014 |
| KR | 1020140100126 | 8/2014 |

* cited by examiner

*Primary Examiner* — David D Davis
(74) *Attorney, Agent, or Firm* — Cantor Colburn LLP (57) ABSTRACT

A liquid crystal display includes a first substrate and a second substrate facing each other. The liquid crystal display further includes a gate line and a data line disposed on the first substrate, a first thin film transistor and a second thin film transistor connected to the gate line and the data line, a first subpixel electrode connected to the first thin film transistor, a third thin film transistor connected to the second thin film transistor, a second subpixel electrode connected to the third thin film transistor; and a liquid crystal layer interposed between the first substrate and the second substrate. The third thin film transistor includes a first terminal applied with a same constant voltage during all times of operation, a second terminal directly connected to the second thin film transistor, and a third terminal connected to the second subpixel electrode.

16 Claims, 12 Drawing Sheets

LIQUID CRYSTAL DISPLAY WITH INCREASED APERTURE RATIO

This application claims priority to Korean Patent Application No. 10-2015-0057296 filed on Apr. 23, 2015, and all the benefits accruing therefrom under 35 U.S.C. § 119, the content of which in its entirety is incorporated herein by reference.

BACKGROUND (a) Field

The invention relates to a liquid crystal display ("LCD"). More particularly, the invention relates to an LCD capable of improving an aperture ratio.

(b) Description of the Related Art

A liquid crystal display ("LCD") is one of the most widely used flat panel display devices. The LCD generally includes two display panels where a field generating electrode such as a pixel electrode and a common electrode is formed and a liquid crystal layer interposed therebetween.

The LCD generates an electric field in a liquid crystal layer by applying voltage to the field generating electrode, to determine orientations of liquid crystal molecules of the liquid crystal layer and control polarization of incident light, thereby displaying an image.

The LCD also includes a switching element connected to each pixel electrode, and a plurality of signal lines such as gate lines and data lines for applying a voltage to the pixel electrodes by controlling the switching elements.

Among various types of LCDs, a vertical alignment mode LCD, which arranges major axes of liquid crystal molecules so as to be vertical to the display panel when an electric field is not applied, has been widely used due to its high contrast ratio and wide reference viewing angle. Here, the reference viewing angle implies a viewing angle that is 1:10 in contrast ratio, or a critical angle of gray-to-gray luminance reversion.

In order to approximate side visibility to front visibility in the vertical alignment mode LCD, a method of causing a difference in transmittance by dividing one pixel into two sub-pixels and applying different voltages to the two sub-pixels has been proposed. In this case, to differentiate the voltages of two subpixels, the thin film transistor is added and a region for contacting the wiring is increased such that an aperture ratio is decreased.

SUMMARY

The invention provides a liquid crystal display ("LCD") capable of improving an aperture ratio.

An LCD according to an exemplary embodiment of the invention includes a first substrate and a second substrate facing each other, a gate line and a data line disposed on the first substrate, a first thin film transistor ("TFT") and a second TFT connected to the gate line and the data line, a first subpixel electrode connected to the first TFT, a third TFT connected to the second TFT, a second subpixel electrode connected to the third TFT, and a liquid crystal layer interposed between the first substrate and the second substrate.

In an exemplary embodiment, the third TFT may include a first terminal applied with a constant voltage, a second terminal connected to the second TFT, and a third terminal connected to the second subpixel electrode.

In an exemplary embodiment, a first data voltage applied to the first subpixel electrode may be different from a second data voltage applied to the second subpixel electrode.

In an exemplary embodiment, a difference of the first data voltage and the second data voltage may be determined by the voltage applied to the first terminal of the third TFT.

In an exemplary embodiment, a resistance of the third TFT may be more than about 0.1 mega-ohm (MΩ) and less than about 1000 MΩ.

In an exemplary embodiment, a first voltage line disposed on the first substrate may be further included, and the third TFT may be connected to the first voltage line.

In an exemplary embodiment, the first voltage line may be applied with a constant voltage.

In an exemplary embodiment, the first voltage line may be disposed in the same layer as the gate line.

In an exemplary embodiment, the first voltage line may extend in a direction parallel to the gate line.

In an exemplary embodiment, the first TFT may include a first gate electrode connected to the gate line, a first semiconductor disposed on the first gate electrode, and a first source electrode and a first drain electrode disposed on the first semiconductor, the second TFT may include a second gate electrode connected to the gate line, a second semiconductor disposed on the second gate electrode, and a second source electrode and a second drain electrode disposed on the second semiconductor, and the third TFT may include a third gate electrode connected to the first voltage line, a third semiconductor disposed on the third gate electrode, and a third source electrode and a third drain electrode disposed on the third semiconductor.

In an exemplary embodiment, the first source electrode may be connected to the data line and the first drain electrode may be connected to the first subpixel electrode.

In an exemplary embodiment, the second source electrode may be connected to the data line, and the second drain electrode may be connected to the third source electrode.

In an exemplary embodiment, the third source electrode may be connected to the second drain electrode, and the third drain electrode may be connected to the second subpixel electrode.

In an exemplary embodiment, a channel size of the second TFT may be the same as a channel size of the third TFT.

In an exemplary embodiment, a shielding electrode overlapping the data line may be further included.

In an exemplary embodiment, the shielding electrode may be disposed in the same layer as the first subpixel electrode and the second subpixel electrode.

In an exemplary embodiment, a connection electrode connecting adjacent shielding electrodes to each other may be further included.

In an exemplary embodiment, the LCD according to an exemplary embodiment of the invention has following effects.

In an exemplary embodiment, the LCD according to an exemplary embodiment of the invention may improve visibility and aperture ratio.

BRIEF DESCRIPTION OF THE DRAWINGS

The above and other exemplary embodiments, advantages and features of this disclosure will become more apparent by describing in further detail exemplary embodiments thereof with reference to the accompanying drawings, in which.

DETAILED DESCRIPTION

The invention will be described more fully hereinafter with reference to the accompanying drawings, in which exemplary embodiments of the invention are shown. As those skilled in the art would realize, the described embodiments may be modified in various different ways, all without departing from the spirit or scope of the invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

First, a liquid crystal display ("LCD") according to an exemplary embodiment of the invention will be described with reference to accompanying drawings.

Figure 1:
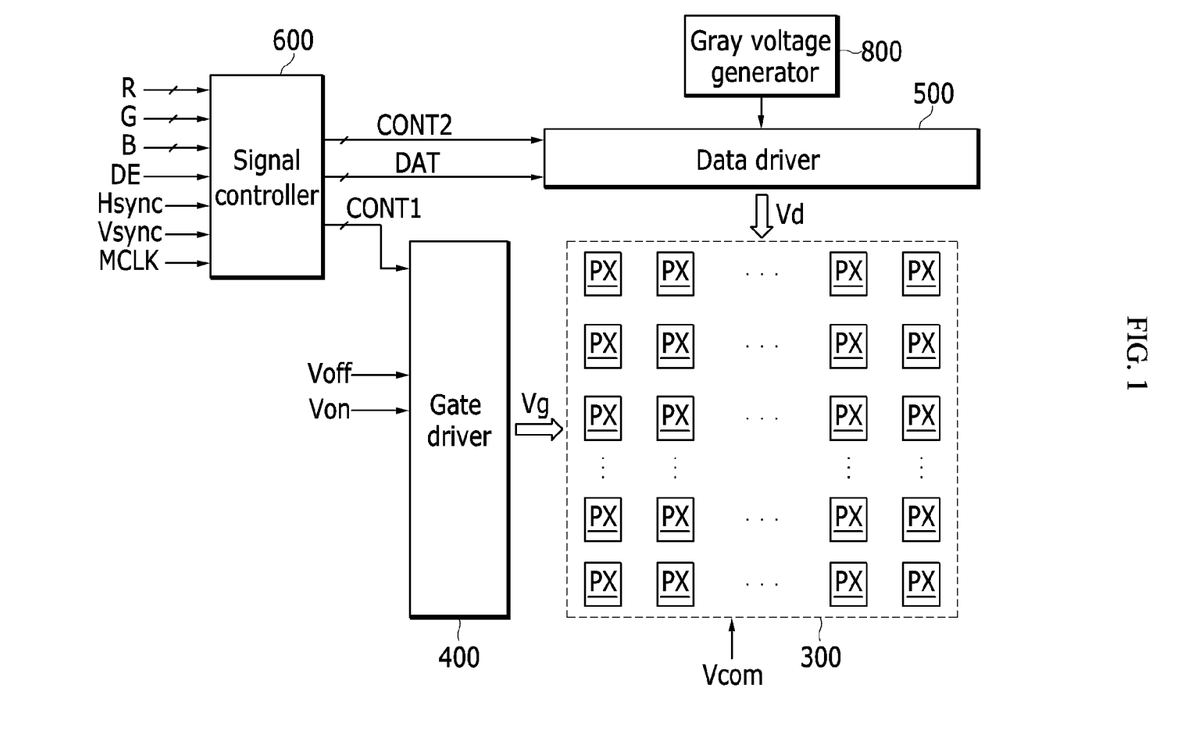
FIG. 1 is a block diagram of an LCD according to an exemplary embodiment of the invention.
Figure 2:
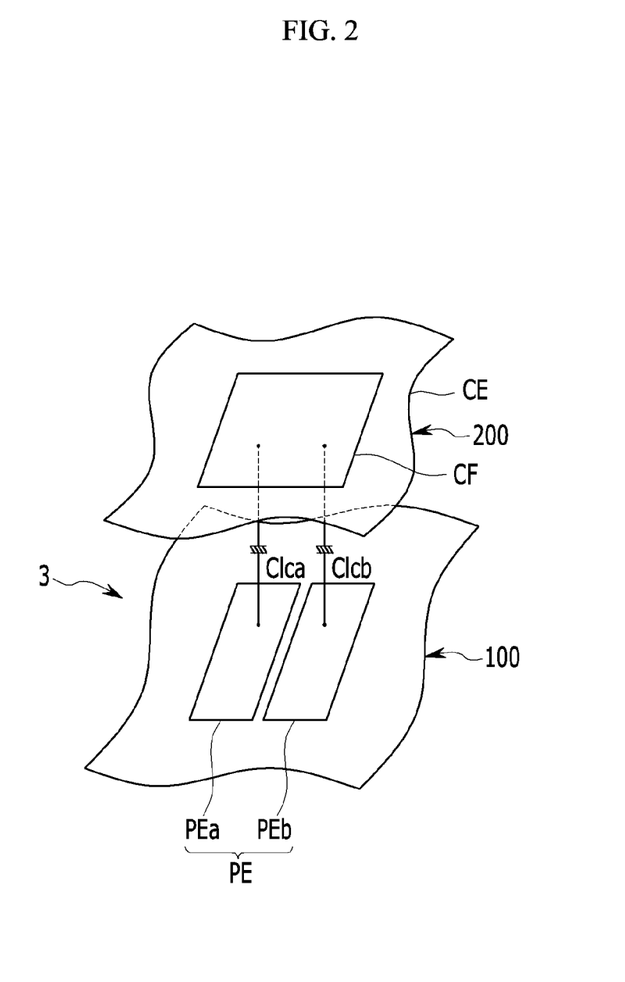
FIG. 2 is an equivalent circuit diagram illustrating a single pixel together with a structure of an LCD according to an exemplary embodiment of the invention.

FIG. 1 is a block diagram of an LCD according to an exemplary embodiment of the invention, and FIG. 2 is an equivalent circuit diagram illustrating a single pixel together with a structure of an LCD according to an exemplary embodiment of the invention.

As shown in FIG. 1, an LCD according to an exemplary embodiment of the invention includes a liquid crystal panel assembly 300, a gate driver 400 and a data driver 500 which are connected to the liquid crystal panel assembly 300, a gray voltage generator 800 connected to the data driver 500, and a signal controller 600 that controls the above components.

In an equivalent circuit, the liquid crystal panel assembly 300 includes a plurality of signal lines (not shown) and a plurality of pixels PX that are connected to the signal lines and substantially arranged in a matrix. As shown from the structure shown in FIG. 2, the liquid crystal panel assembly 300 includes a TFT array panel 100 and an opposite display panel 200, which face each other, and a liquid crystal layer 3 interposed therebetween.

The signal lines include a plurality of gate lines (not shown) that transmit a gate signal (also referred to as "scanning signal") and a plurality of data lines (not shown) that transmits a data signal. In an exemplary embodiment, the gate lines substantially extend in a row direction and are substantially parallel to each other. In an exemplary embodiment, the data lines substantially extend in a column direction and are substantially parallel to each other.

Each of the pixels PX includes a pair of subpixels and each of the subpixels includes a liquid crystal capacitor Clca and Clcb. At least one of two subpixels includes a switching element (not shown) that is connected to the gate line, the data line, and the liquid crystal capacitors Clca and Clcb.

The liquid crystal capacitors Clca and Clcb respectively include a subpixel electrode PEa/PEb of the TFT array panel 100 and a common electrode CE of the opposite display panel 200 as two terminals and the liquid crystal layer 3 between the subpixel electrodes PEa/PEb and the common electrode CE functions as a dielectric material. A pair of subpixel electrodes PEa/PEb is separated from each other and constitute one pixel electrode PE. The common electrode CE is disposed on an entire surface of the opposite display panel 200 and a common voltage Vcom is applied thereto. In an exemplary embodiment, the liquid crystal layer 3 has a positive dielectric anisotropy, and the liquid crystal molecules of the liquid crystal layer 3 are oriented such that the direction of the liquid crystal molecules may be vertical to the TFT array panel 100 in a state where there is no electric field applied.

In order to materialize color representation, by allowing the pixel PX to uniquely display any one primary color (spatial division) or to alternatively display primary colors in accordance with time (temporal division), a desired color may be recognized by spatial and temporal sums of the primary colors. Examples of the primary colors include three primary colors, such as red, green, and blue. FIG. 2 is an example of spatial division and shows that each of the pixels PX includes a color filter CF indicating one of the primary colors in a region of the opposite display panel 200. Differently from FIG. 2, the color filter CF may be disposed on or below the subpixel electrodes PEa and PEb of the thin film transistor ("TFT") array panel 100.

At least one polarizer (not shown) that polarizes light is attached to an outer surface of the liquid crystal panel assembly 300.

Referring to FIG. 1 again, the gray voltage generator 800 generates an entire gray voltage or a limited number of gray voltages (hereinafter, referred to as "reference gray voltages) related to a transmittance of the pixel PX. The (reference) gray voltage may be positive or negative with respect to the common voltage Vcom.

The gate driver 400 is connected to the gate line of the liquid crystal panel assembly 300 to apply a gate signal Vg including a combination of a gate-on voltage Von and a gate-off voltage Voff to the gate line.

The data driver 500 is connected to the data line of the liquid crystal panel assembly 300, selects a gray voltage from the gray voltage generator 800, and applies the selected gray voltage to the data line as a data signal Vd. However, when the gray voltage generator 800 does not provide the voltage for all gray levels, but provide a predetermined number of reference gray voltages, the data driver 500 divides the reference gray voltage to generate a gray voltage for all gray levels and then selects a data signal from among them.

The signal controller 600 controls the gate driver 400 and the data driver 500. The signal controller 600 may output control signals CONT1 and CONT2 to the gate driver 400 and the data driver 500, respectively, to control the gate driver 400 and the data driver 500. The signal controller 600 may also output a data signal DAT to the data driver 500.

In an exemplary embodiment, the drivers 400, 500, 600, and 800 may be directly disposed (e.g., installed) on the liquid crystal panel assembly 300 as a form of at least one integrated circuit ("IC") chip, or installed on a flexible printed circuit film (not shown) to be attached on the liquid crystal panel assembly 300 as a form of a tape carrier package ("TCP"), or installed on a separate printed circuit board ("PCB") (not shown). In another exemplary embodiment, the above-mentioned drivers 400, 500, 600, and 800 may be integrated in the liquid crystal panel assembly 300 together with the signal line and the TFT switching element. Further, the drivers 400, 500, 600, and 800 may be integrated as a single chip. In this case, at least one driver or at least one circuit element that constitutes the driver may be disposed outside the single chip.

Next, an LCD according to an exemplary embodiment of the invention will be further described with reference to FIG. 3 to FIG. 9, in addition to FIG. 1 and FIG. 2.

Figure 3:
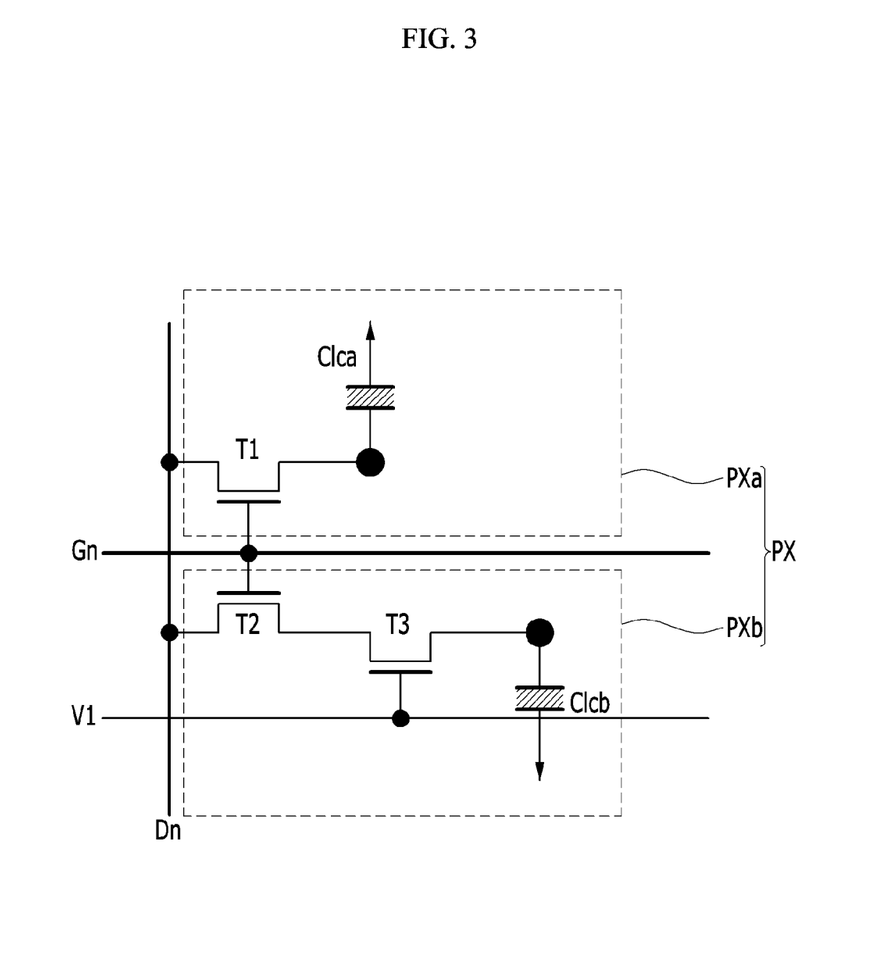
FIG. 3 is an equivalent circuit diagram of a pixel of an LCD according to an exemplary embodiment of the invention.
Figure 4:
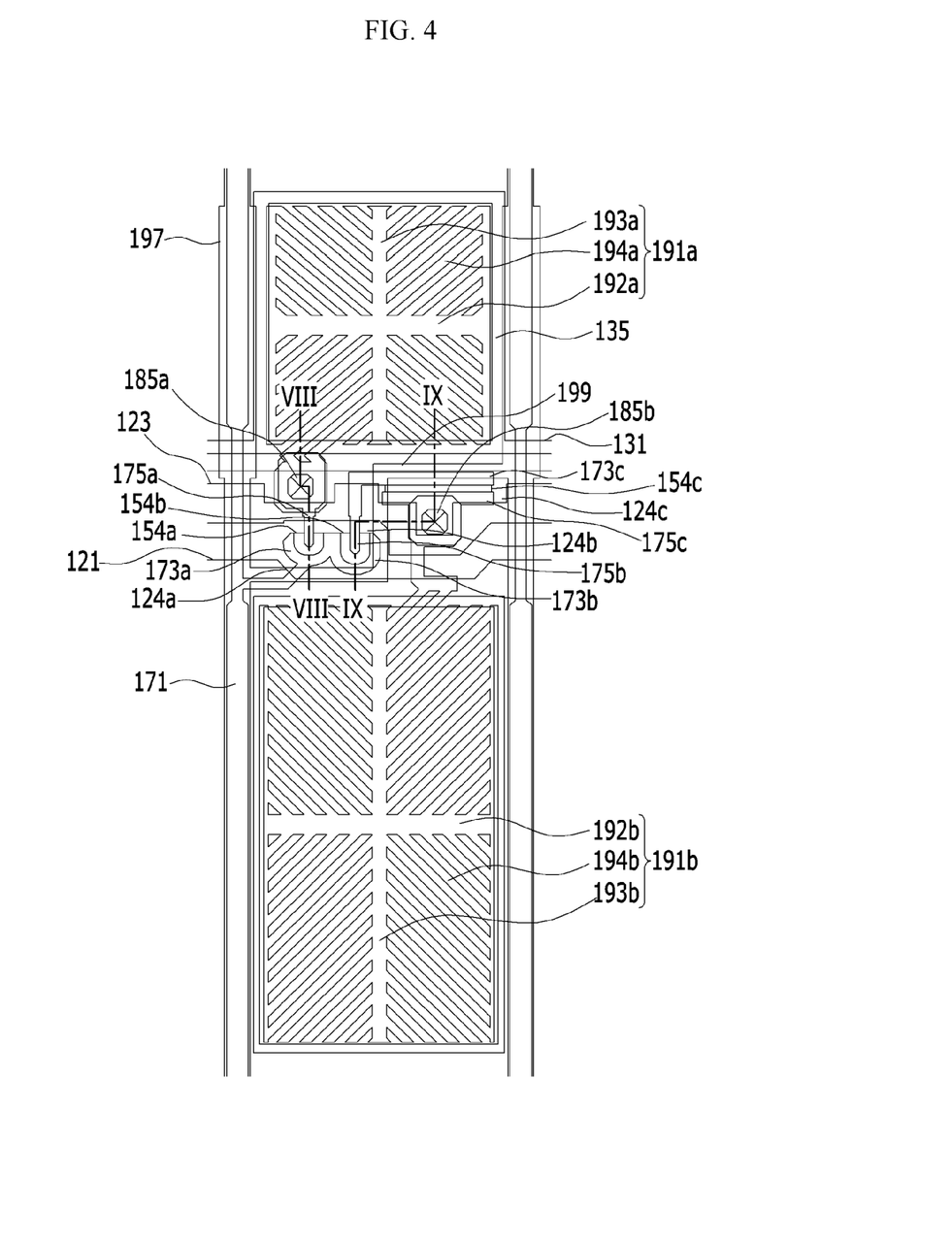
FIG. 4 is a top plan view of a thin film transistor array panel of an LCD according to an exemplary embodiment of the invention.
Figure 5:
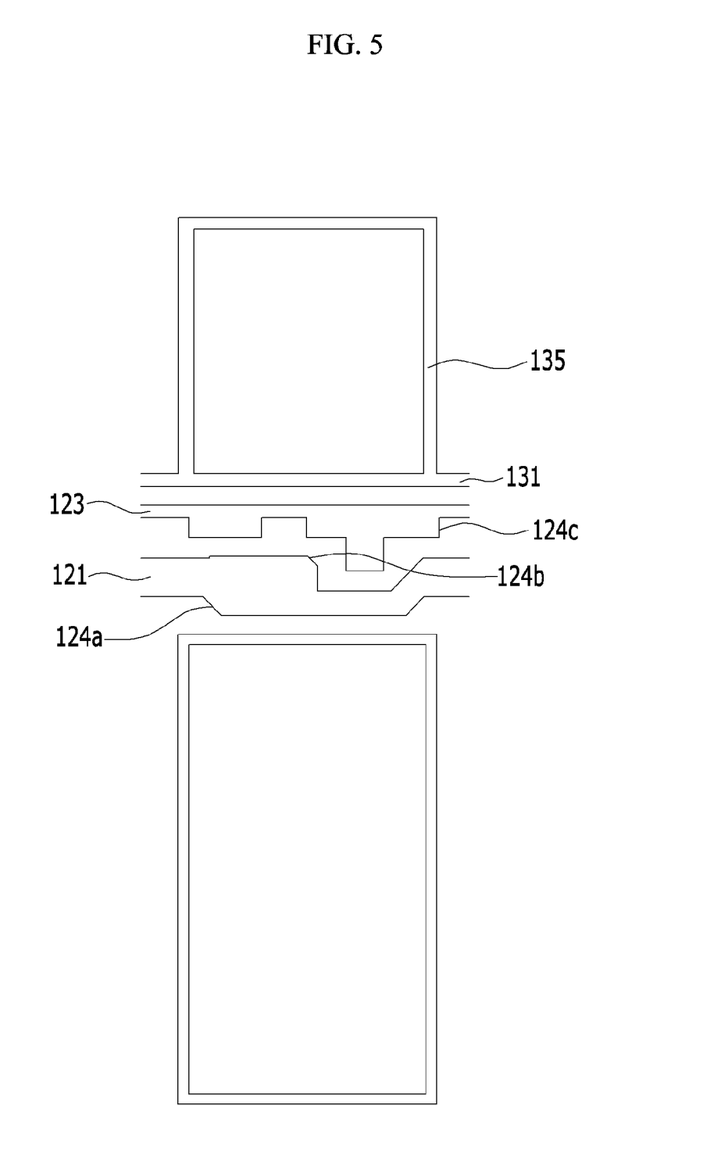
FIG. 5 to FIG. 7 are top plan views of a part of a layer of an LCD according to an exemplary embodiment of the invention.
Figure 6:
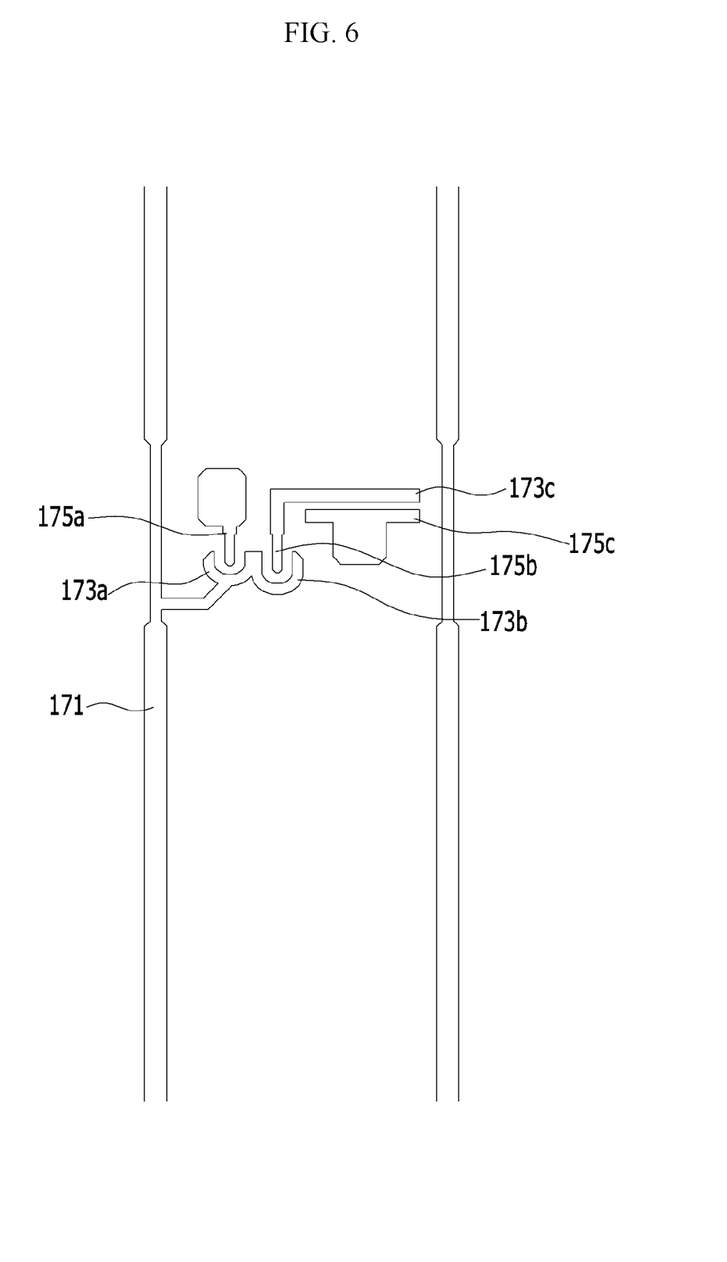
Figure 7:
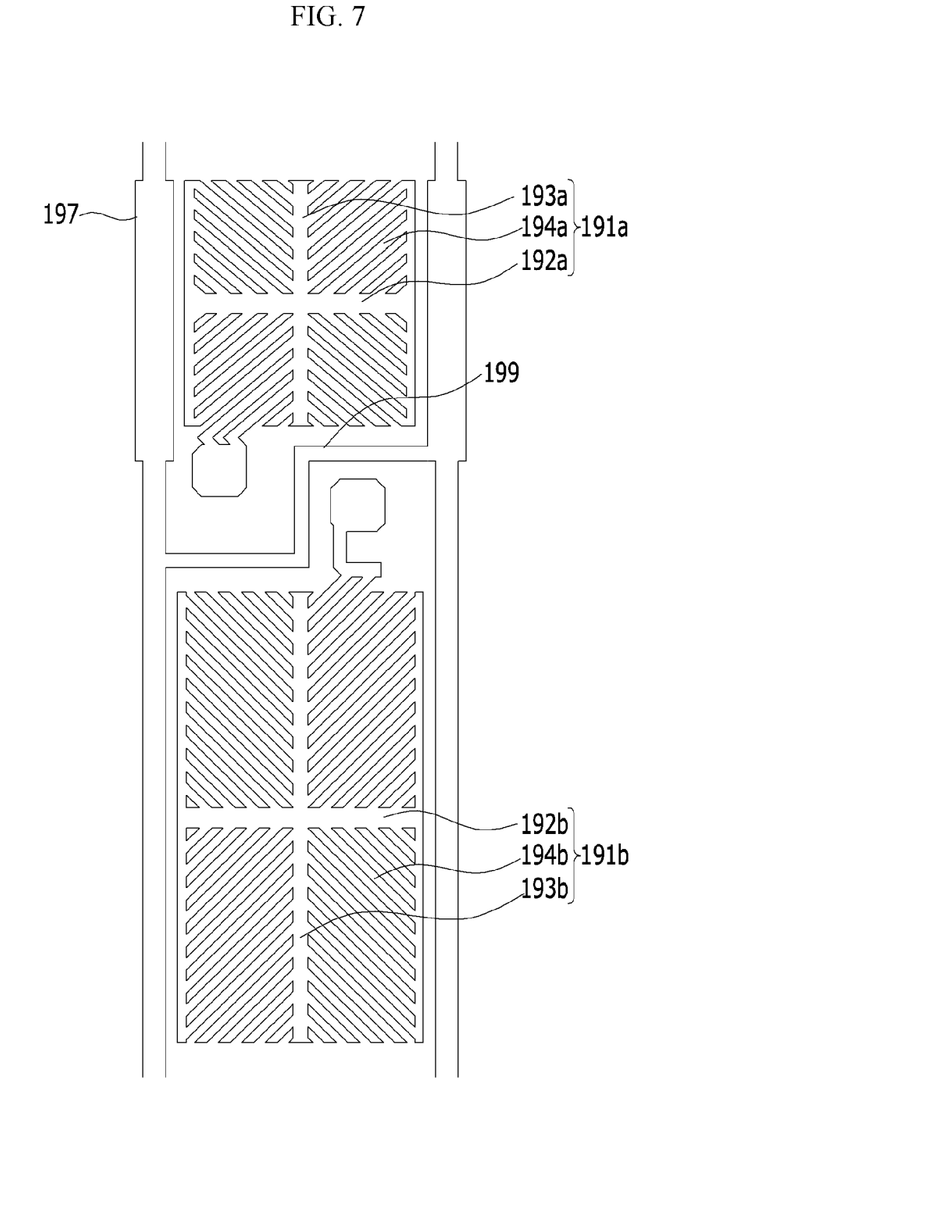
Figure 8:
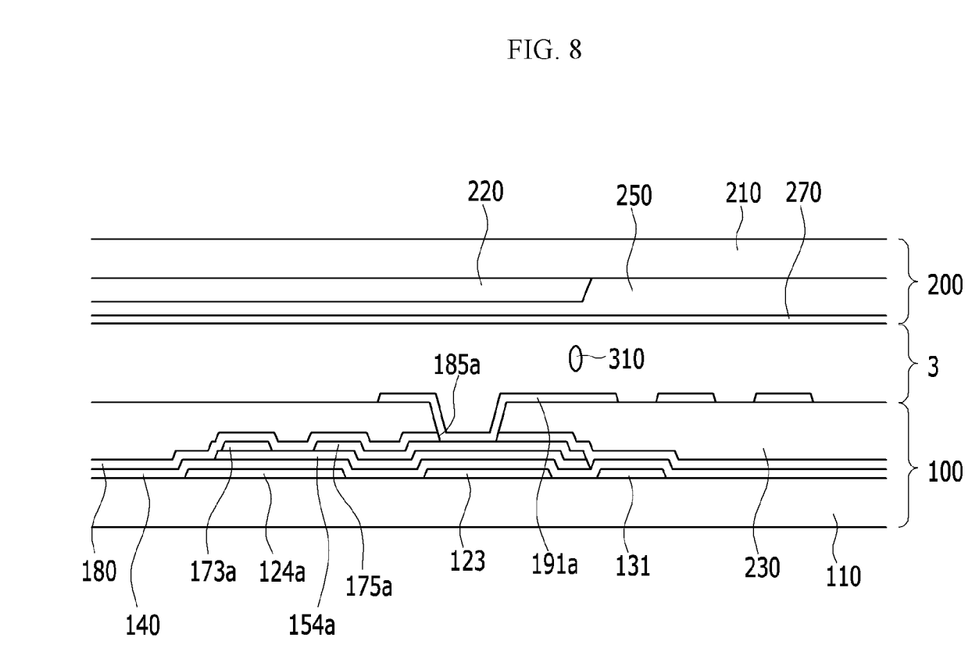
FIG. 8 is a cross-sectional view of an LCD according to an exemplary embodiment of the invention taken along line VIII-VIII of FIG. 4.
Figure 9:
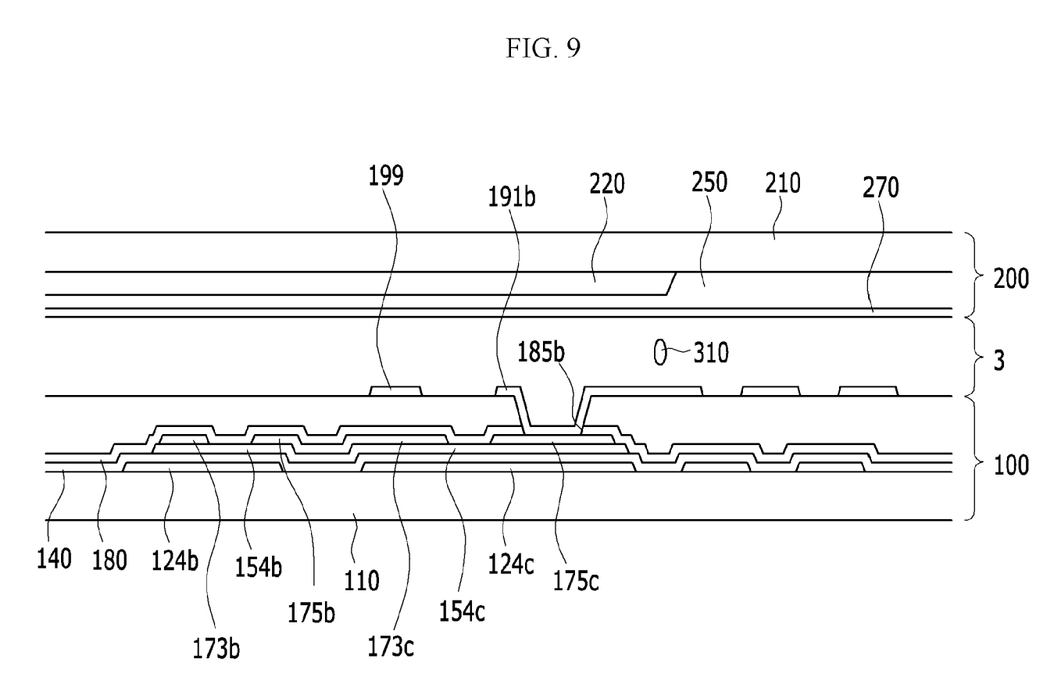
FIG. 9 is a cross-sectional view of an LCD according to an exemplary embodiment of the invention taken along line IX-IX of FIG. 4.

FIG. 3 is an equivalent circuit diagram of a pixel of an LCD according to an exemplary embodiment of the invention, FIG. 4 is a top plan view of a TFT array panel of an LCD according to an exemplary embodiment of the invention, and FIG. 5 to FIG. 7 are top plan views of a part of a layer of an LCD according to an exemplary embodiment of the invention. FIG. 5 shows a gate metal layer, FIG. 6 shows a data metal layer, and FIG. 7 shows a layer including a first subpixel electrode, a second subpixel electrode, and a shielding electrode. FIG. 8 is a cross-sectional view of an LCD according to an exemplary embodiment of the invention taken along line VIII-VIII of FIG. 4, and FIG. 9 is a cross-sectional view of an LCD according to an exemplary embodiment of the invention taken along line IX-IX of FIG. 4.

Referring to FIG. 1 and FIG. 3, the LCD according to an exemplary embodiment of the invention includes a plurality of signal lines Gn, Dn, and V1, and a plurality of pixels PX connected to the signal lines.

The signal lines Gn, Dn, and SL include a gate line Gn that transmits a gate signal (also referred to as a "scanning signal"), a data line Dn that transmits a data voltage, and a first voltage line V1 storage electrode line SL to which a constant DC voltage is applied.

A first TFT T1 and a second TFT T2 that are connected to the same gate line Gn and the same data line Dn are provided. Also, a third TFT T3 connected to the first voltage line V1 and the second TFT T2 is further provided.

Each pixel PX includes two subpixels PXa and PXb. A first liquid crystal capacitor Clca that is connected to the first TFT T1 is disposed in the first subpixel PXa. Further, a second liquid crystal capacitor Clcb that is connected to the third TFT T3 is disposed in the second subpixel PXb.

A first terminal of the first TFT T1 is connected to the gate line Gn, a second terminal thereof is connected to the data line Dn, and a third terminal thereof is connected to the first liquid crystal capacitor Clca. A first terminal of the second TFT T2 is connected to the gate line Gn, a second terminal thereof is connected to the data line Dn, and a third terminal thereof is connected to the third TFT T3. A first terminal of the third TFT T3 is connected to the first voltage line V1, a second terminal thereof is connected to the third terminal of the second TFT T2, and a third terminal thereof is connected to the second liquid crystal capacitor Clcb.

According to an operation of the LCD according to an exemplary embodiment of the invention, when a gate-on voltage is applied to the gate line Gn, the first and second TFTs T1 and T2 connected thereto are turned on. The predetermined direct current ("DC") voltage is applied to the first terminal of the third TFT T3 and is always in the turned-on state. However, a predetermined resistance is provided depending on the magnitude of the voltage applied to the first terminal of the third TFT T3. When high voltage is applied to the first terminal of the third TFT T3, the resistance of the third TFT T3 is decreased, and when low voltage is applied to the first terminal of the third TFT T3, the resistance of the third TFT T3 is increased.

The first liquid crystal capacitor Clca is charged by the data voltage transmitted through the data line Dn. The second liquid crystal capacitor Clca is charged after the data voltage transmitted through the data line Dn is decreased by the resistance component while passing the third TFT T3. That is, the second liquid crystal capacitor Clcb is charged with a lower voltage than that of the first liquid crystal capacitor Clca. As such, by making the voltages that are charged in different subpixels PXa and PXb in the same pixel PX different, side visibility may be improved.

Next, the structure of the LCD according to an exemplary embodiment of the invention will be described in detail with reference to FIG. 4 to FIG. 9.

First, the TFT array panel 100 will be described.

A gate metal layer including a gate line 121, a first gate electrode 124a, a second gate electrode 124b, a first voltage line 123, and a third gate electrode 124c is disposed on a first substrate 110 including a transparent glass or plastic, for example.

The gate line 121 mainly extends in a horizontal direction and transmits a gate signal. The gate signal may include a gate-on voltage and a gate-off voltage. The first gate electrode 124a and the second gate electrode 124b protrude from the gate line 121 and are connected to each other. The first gate electrode 124a and the second gate electrode 124b are applied with the same gate signal through the gate line 121.

The first voltage line 123 may be provided with the same layer as the gate line 121 and may extend in a direction parallel to the gate line 121. The first voltage line 123 extends in a horizontal direction and is applied with the predetermined voltage. The third gate electrode 124c is protruded from the first voltage line 123. Accordingly, the third gate electrode 124c is applied with a predetermined voltage through the first voltage line 123.

A storage electrode line 131 may be further disposed on the first substrate 110. The storage electrode line 131 may be disposed in a direction parallel to the gate line, and the storage electrode line 131 may be applied with a predetermined voltage such as a common voltage. A storage electrode 135 protruding from the storage electrode line 131 may be further disposed. The storage electrode 135 may be provided to enclose the edge of two subpixels PXa and PXb (refer to FIG. 3). A plurality of storage electrodes 135 disposed in the pixels PX adjacent to each other may be connected to each other.

A gate insulating layer 140 is disposed on the gate line 121, the first voltage line 123, the first gate electrode 124a, the second gate electrode 124b, the third gate electrode 124c, the storage electrode line 131, and the storage electrode 135. In an exemplary embodiment, the gate insulating layer 140 may include an inorganic insulating material such as silicon nitride (SiNx) or silicon oxide (SiOx), for example. The gate insulating layer 140 may include a single layer or multiple layers.

A first semiconductor 154a, a second semiconductor 154b, and a third semiconductor 154c are disposed on the gate insulating layer 140. The first semiconductor layer 154a may be located on the first gate electrode 124a, the second semiconductor layer 154b may be located on the second gate electrode 124b, and the third semiconductor layer 154c may be located on the third gate electrode 124c. The first semiconductor 154a, the second semiconductor 154b, and the third semiconductor 154c may include amorphous silicon, polycrystalline silicon, or a metal oxide.

Although not shown, an ohmic contact may further be respectively disposed on the first semiconductor 154a, the second semiconductor 154b, and the third semiconductor 154c. In an exemplary embodiment, the ohmic contact may include a material such as a silicide or an n+ hydrogenated amorphous silicon with an n-type impurity doped at a high concentration.

A data metal layer including a data line 171, a first source electrode 173a, a first drain electrode 175a, a second source electrode 173b, a second drain electrode 175b, a third source electrode 173c, and a third drain electrode 175c is disposed on the first, second, and third semiconductors 154a, 154b, and 154c, and the gate insulating layer 140.

The first, second, and third semiconductors 154a, 154b, and 154c may be disposed under the data line 171. Also, the first semiconductor 154a and the second semiconductor 154b may be connected to each other, and the second semiconductor 154b and the third semiconductor 154c may be connected to each other. However, the invention is not limited thereto, and the first, second, and third semiconductors 154a, 154b, and 154c may only be disposed on the first, second, and third gate electrodes 124a, 124b, and 124c, and the first semiconductor 154a, the second semiconductor 154b, and the third semiconductor 154c may be separated from each other.

The data line 171 transmits a data signal and mainly extends in a vertical direction, thereby crossing the gate line 121.

The first source electrode 173a protrudes from the data line 171 on the first gate electrode 124a. In an exemplary embodiment, the first source electrode 173a may have a "C" shape on the first gate electrode 124a.

The first drain electrode 175a is provided to be separated from the first source electrode 173a on the first gate electrode 124a. A channel is disposed in the first semiconductor 154a of the exposed portion between the first source electrode 173a and the first drain electrode 175a provided to be separated from each other. The first drain electrode 175a includes a bar end and a wide end extended therefrom. The bar end of the first drain electrode 175a is enclosed by the first source electrode 173a. The wide end of the first drain electrode 175a overlaps the first voltage line 123.

The second source electrode 173b is provided to protrude from the data line 171 on the second gate electrode 124b. In an exemplary embodiment, the second source electrode 173b may have the "C" shape on the second gate electrode 124b.

The second drain electrode 175b is provided to be separated from the second source electrode 173b on the second gate electrode 124b. A channel is disposed in the second semiconductor 154b of the exposed portion between the second source electrode 173b and the second drain electrode 175b that are provided to be separated from each other. One end of the second drain electrode 175b is enclosed by the second source electrode 173b.

The third source electrode 173c is connected to the second drain electrode 175b and is disposed on the third gate electrode 124c. In an exemplary embodiment, the third source electrode 173c may have a bar shape.

The third drain electrode 175c is provided to be separated from the third source electrode 173c on the third gate electrode 124c. A channel is disposed in the third semiconductor 154c of the exposed portion between the third source electrode 173c and the third drain electrode 175c that are provided to be separated from each other.

The first gate electrode 124a, the first semiconductor 154a, the first source electrode 173a, and the first drain electrode 175a form the first TFT T1 (refer to FIG. 3). Also, the second gate electrode 124b, the second semiconductor 154b, the second source electrode 173b, and the second drain electrode 175b form the second TFT T2 (refer to FIG. 3). The third gate electrode 124c, the third semiconductor 154c, the third source electrode 173c, and the third drain electrode 175c form the third TFT T3 (refer to FIG. 3).

A first passivation layer 180 is disposed on the data line 171, the first, second, and third source electrodes 173a, 173b, and 173c, and the first, second, and third drain electrodes 175a, 175b, and 175c. In an exemplary embodiment, the first passivation layer 180 may include the inorganic insulating material, for example.

A second passivation layer 230 is disposed on the first passivation layer 180. The second passivation layer 230 may include an organic insulating material and may be particularly including a color filter. In an exemplary embodiment, the color filter may display one primary color, such as one of the three primary colors of red, green, and blue. In an exemplary embodiment, the primary colors may include red, green, and blue, or yellow, cyan, and magenta, for example. The color filter may be further configured with a color filter for expressing a combination of the primary colors or white.

A first contact hole 185a exposing at least a portion of the first drain electrode 175a and a second contact hole 185b exposing at least a portion of the third drain electrode 175c are defined in the first passivation layer 180 and the second passivation layer 230.

A first subpixel electrode 191a and a second subpixel electrode 191b are disposed on the second passivation layer 230.

The first subpixel electrode 191a is connected to the first drain electrode 175a through the first contact hole 185a, and the second subpixel electrode 191b is connected to the third drain electrode 175c through the second contact hole 185b.

The first subpixel electrode 191a and the second subpixel electrode 191b are applied with the same data voltage from the first drain electrode 175a and the third drain electrode 175c. In this case, the same data voltage is transmitted to the first TFT T1 and the second TFT T2, but a voltage drop is generated by the resistance component of the third TFT T3 such that the magnitude of the second data voltage applied to the second subpixel electrode 191b is smaller than the first data voltage applied to the first subpixel electrode 191a. This is a case in which the data voltage applied to the first subpixel electrode 191a and the second subpixel electrode 191b is positive, and in contrast, when the data voltage applied to the first subpixel electrode 191a and the second subpixel electrode 191b is negative, the voltage applied to the first subpixel electrode 191a may be smaller than the voltage applied to the second subpixel electrode 191b.

A difference between the first data voltage applied to the first subpixel electrode and the second data voltage applied to the second subpixel electrode is determined by the first terminal of the third TFT T3, that is, the voltage applied to the third gate electrode 124c. As the voltage applied to the third gate electrode 124c of the third TFT T3 is increased, the magnitude of the resistance component of the third TFT T3 is decreased. Accordingly, since the amount of decrease by the third TFT T3 is small, the difference between the first data voltage and the second data voltage is also decreased. In contrast, since the voltage applied to the third gate electrode 124c of the third TFT T3 is small, the magnitude of the resistance component of the third TFT T3 is large. Accordingly, the amount of decrease by the third TFT T3 is large such that the difference between the first data voltage and the second data voltage is large.

Also, the difference between the first data voltage applied to the first subpixel electrode and the second data voltage applied to the second subpixel electrode is determined by the magnitude of the channel of the third TFT T3. Since the width of the channel of the third TFT T3 is small, the magnitude of the resistance component of the third TFT T3 is small. Accordingly, the amount of decrease by the third TFT T3 is small such that the difference between the first data voltage and the second data voltage is decreased. In contrast, as the width of the channel of the third TFT T3 is increased, the magnitude of the resistance component of the third TFT T3 is increased. Accordingly, the amount of decrease by the third TFT T3 is large such that the difference between the first data voltage and the second data voltage is large.

As described above, the difference of the first data voltage and the second data voltage is differentiated depending on the magnitude of the resistance of the third TFT T3. The resistance of the third TFT T3 may be changed depending on the voltage applied to the third gate electrode 124c of the third TFT T3 or the channel magnitude of the third TFT T3. In an exemplary embodiment, the resistance of the third TFT T3 is greater than about 0.1 mega-ohm (MΩ) but less than about 1,000 MΩ, for example.

When the difference of the first data voltage and the second data voltage is controlled through the voltage applied to the third gate electrode 124c of the third TFT T3, the channel magnitude of the third TFT T3 may be equal to the channel magnitude of the second TFT T2. When the LCD is in a high temperature state, a characteristic of the TFT may be changed, and when the channel magnitudes of the second TFT T2 and the third TFT T3 are not equal to each other, the characteristic changes of the second TFT T2 and the third TFT T3 are different. In the illustrated exemplary embodiment, by controlling the channel magnitude of the second TFT T2 and the third TFT T3 to be the same, the change amounts of the characteristics of two TFTs T2 and T3 may be equal in the high temperature state. Therefore, reliability in the high temperature state may be improved.

In an exemplary embodiment, an area of the second subpixel electrode 191b may be approximately one to two times larger than that of the first subpixel electrode 191a, for example.

The first subpixel electrode 191a and the second subpixel electrode 191b neighbor each other in the column direction, and the overall shape thereof may be quadrangular and includes a cross stem having a transverse stem 192a or 192b and a longitudinal stem 193a or 193b, which intersect. The first and second sub-pixel electrodes 191a and 191b are divided into four sub-regions by the transverse stems 192a and 192b and the longitudinal stems 193a and 193b, and each of the sub-regions includes a plurality of minute branches 194a and 194b.

One of the minute branches 194a and 194b disposed at the four subregions is disposed to obliquely extend from the horizontal stems 192a and 192b or the vertical stems 193a and 193b in an upper left direction, and another minute branch is disposed to obliquely extend from the horizontal stems 192a and 192b or the vertical stems 193a and 193b in an upper right direction. Further, another minute branch is disposed to obliquely extend from the horizontal stems 192a and 192b or the vertical stems 193a and 193b in a lower left direction, and the other minute branch is disposed to obliquely extend from the horizontal stems 192a and 192b or the vertical stems 193a and 193b in a lower right direction.

Each of the minute branches 194a and 194b form an angle of approximately 40° to 45° with the horizontal stems 192a and 192b or the vertical stems 193a and 193b. Further, the minute branches 194a and 194b of two adjacent subregions may be perpendicular to each other.

A shielding electrode 197 may be further disposed on the second passivation layer 230. The shielding electrode 197 may be disposed on the same layer as the first and second subpixel electrodes 191a and 191b. The shielding electrode 197 may overlap the data line 171. The shielding electrode 197 may be applied with a constant voltage.

Also, a connection electrode 199 connecting the adjacent shielding electrodes 197 to each other may be further provided. The connection electrode 199 may be disposed in the same layer as the first subpixel electrode 191a, the second subpixel electrode 191b, and the shielding electrode 197.

Next, the opposite display panel 200 will be described.

In an exemplary embodiment, a light blocking member 220 is disposed on a second substrate 210 including transparent glass, plastic, or the like. The light blocking member 220 is also referred to as a black matrix and prevents light leakage. The light blocking member 220 may overlap the gate line 121, the data line 171, the first, second and third TFTs T1, T2, and T3, the first contact hole 185a, and the second contact hole 185b.

The second passivation layer 230 may include the color filter, but the invention is not limited thereto. In another exemplary embodiment, the second passivation layer 230 is not the color filter, but may include an organic insulating material, and the color filter may be disposed on the second substrate 210.

An overcoat 250 may be disposed on the light blocking member 220, and a common electrode 270 is disposed on the overcoat 250.

In the illustrated exemplary embodiment, the light blocking member 220 and the common electrode 270 are disposed in the opposing display panel 200, but the invention is not limited thereto. In another exemplary embodiment, the light blocking member 220 and the common electrode 270 may be disposed in the TFT array panel 100.

The liquid crystal layer 3 is disposed between the TFT array panel 100 and the opposing display panel 200. In an exemplary embodiment, the liquid crystal layer 3 may include liquid crystal molecules having negative dielectric anisotropy, and the liquid crystal molecules may be aligned in a direction perpendicular to the TFT array panel 100, for example. That is, vertical alignment may be realized.

In various structures, to divide one pixel into two subpixels and to differentiate the voltages of two subpixels, three or more TFTs are disposed in one pixel and three contact holes are defined such that the aperture ratio was reduced. In the LCD according to an exemplary embodiment of the invention, three TFTs are provided and two contact holes are defined, thereby relatively improving the aperture ratio. That is, the LCD according to an exemplary embodiment of the invention may simultaneously improve visibility and the aperture ratio.

Next, a change of a second data voltage depending on the voltage applied to the gate electrode of the third TFT in the LCD according to an exemplary embodiment of the invention will be described with reference to FIG. 10.

Figure 10:
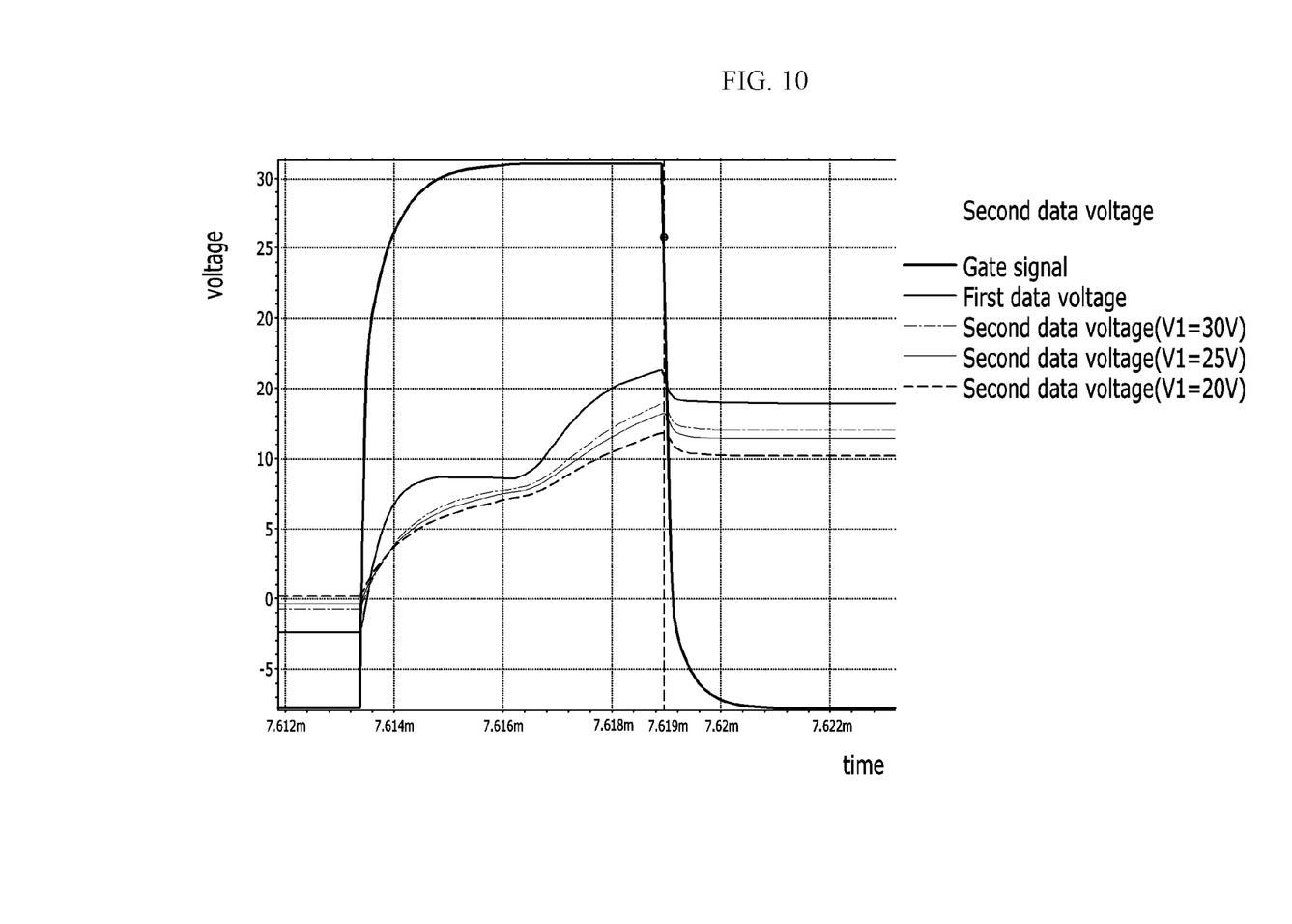
FIG. 10 is a graph showing a first data voltage and a second data voltage along with a gate signal.

FIG. 10 is a graph showing a first data voltage and a second data voltage along with a gate signal.

When the gate signal includes a gate-on voltage and a gate-off voltage and the gate-on voltage is applied, a first data voltage and a second data voltage are increased.

The second data voltage has a lower value than the first data voltage by the resistance component of the third TFT. In this case, the magnitude of the second data voltage is changed depending on the magnitude of the voltage applied to the third gate electrode of the third TFT. When the voltage applied to the third gate electrode is about 20 volts (V), the magnitude of the second data voltage is lowest, when the voltage applied to the third gate electrode is about 25 V, the magnitude of the second data voltage appears a little higher. When the voltage applied to the third gate electrode is about 30 V, the magnitude of the second data voltage appears highest. That is, as the voltage applied to the third gate electrode is increased, the magnitude of the second data voltage is increased. As the voltage applied to the third gate electrode is increased, the difference between the first data voltage and the second data voltage is decreased.

Next, the ratio of the second data voltage for the first data voltage in the LCD according to an exemplary embodiment of the invention will be described with reference to FIG. 11.

Figure 11:
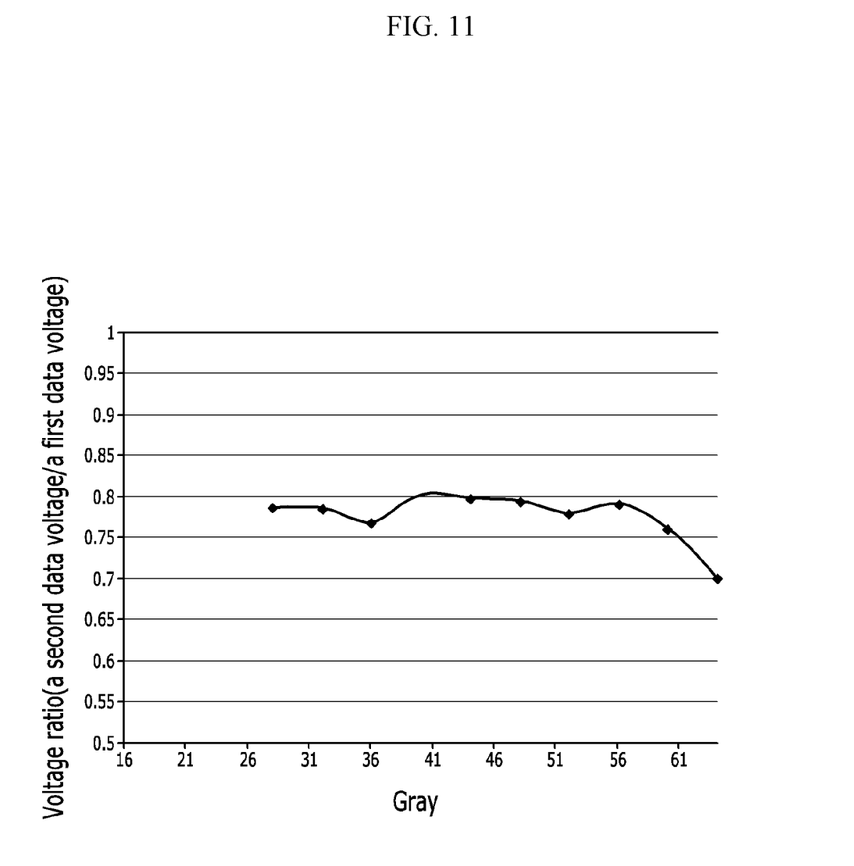
FIG. 11 is a graph showing a ratio of a second data voltage for a first data voltage for each gray.

FIG. 11 is a graph showing a ratio of a second data voltage for a first data voltage for each gray.

As the difference is generated for each gray, it may be confirmed that the ratio of the second data voltage for the first data voltage appears as about 0.8. That is, in the entire gray, the ratio of the second data voltage for the first data voltage is shown to be substantially constant.

Next, a visibility characteristic in the LCD according to an exemplary embodiment of the invention will be described with reference to FIG. 12.

Figure 12:
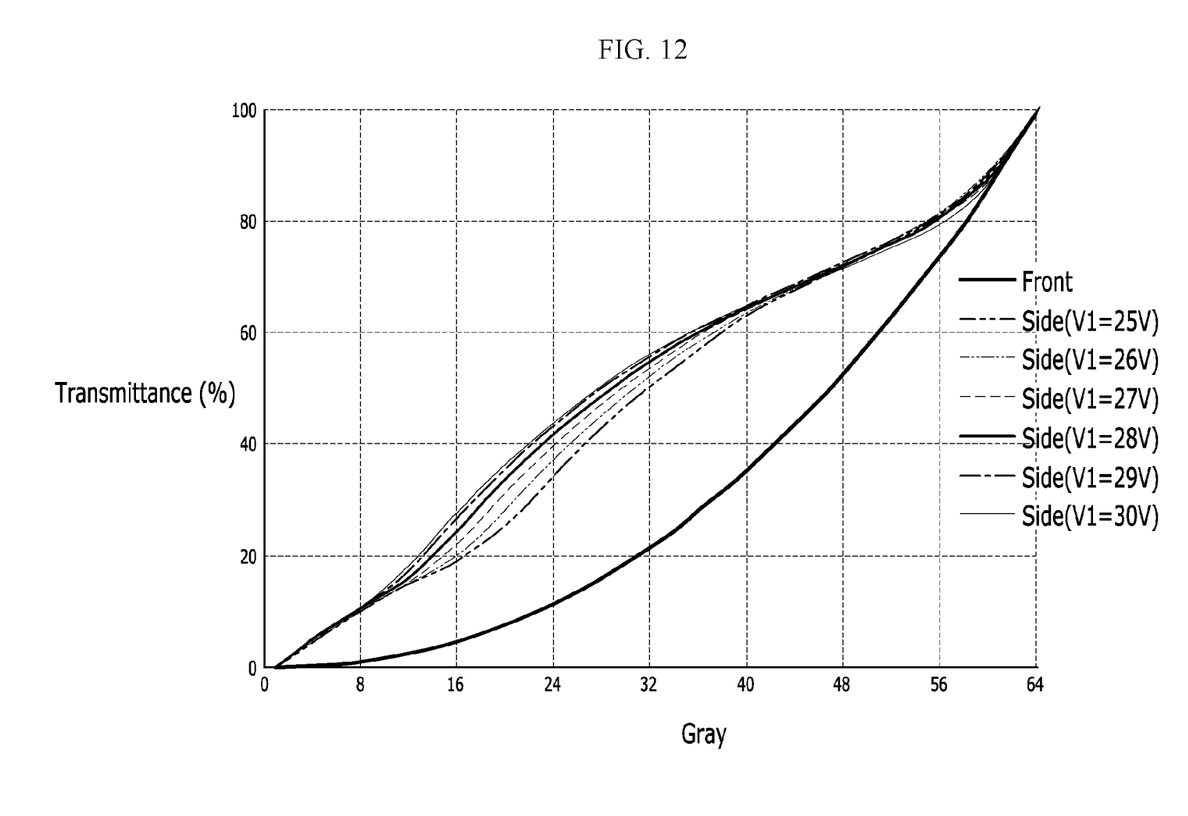
FIG. 12 is a graph showing a gamma curve of a front and a side in an LCD according to an exemplary embodiment of the invention.

FIG. 12 is a graph showing a gamma curve of a front and a side of an LCD according to an exemplary embodiment of the invention. As the lateral gamma curve is closer to the front gamma curve, the lateral visibility may be improved. That is, the screen viewed from the side may be shown to be similar to the screen viewed from the front.

The gamma curve is shown to differentiate depending on the magnitude of the voltage applied to the third gate electrode of the third TFT. As the magnitude of the voltage applied to the third gate electrode of the third TFT is decreased, the difference of the first data voltage and the second data voltage is increased, thereby the lateral gamma curve is shown to be closer to the front gamma curve. That is, as the magnitude of the voltage applied to the third gate electrode is decreased, the effect of improving the lateral visibility appears larger.

As the magnitude of the voltage applied to the third gate electrode is decreased, the magnitude of the second data voltage is decreased such that the transmittance is also decreased. Accordingly, the magnitude of the third gate electrode may be appropriately selected by considering the transmittance and visibility together.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display comprising:
a first substrate and a second substrate facing each other;
a gate line and a data line disposed on the first substrate;
a first thin film transistor and a second thin film transistor connected to the gate line and the data line;
a first subpixel electrode connected to the first thin film transistor;
a third thin film transistor connected to the second thin film transistor;
a second subpixel electrode connected to the third thin film transistor; and
a liquid crystal layer interposed between the first substrate and the second substrate,
wherein the third thin film transistor includes a first terminal applied with a same constant voltage during all times of operation, a second terminal directly connected to the second thin film transistor, and a third terminal connected to the second subpixel electrode.

2. The liquid crystal display of claim 1, wherein:
a first data voltage applied to the first subpixel electrode is different from a second data voltage applied to the second subpixel electrode.

3. The liquid crystal display of claim 2, wherein:
a difference in the first data voltage and the second data voltage is determined by the constant voltage applied to the first terminal of the third thin film transistor.

4. The liquid crystal display of claim 1, wherein:
a resistance of the third thin film transistor is greater than about 0.1 mega-ohm and less than about 1000 mega-ohms.

5. The liquid crystal display of claim 1, further comprising:
a first voltage line disposed on the first substrate and connected to the third thin film transistor.

6. The liquid crystal display of claim 5, wherein:
the first voltage line is applied with a constant voltage.

7. The liquid crystal display of claim 5, wherein:
the first voltage line is disposed in the same layer as the gate line.

8. The liquid crystal display of claim 5, wherein:
the first voltage line extends in a direction parallel to the gate line.

9. The liquid crystal display of claim 5, wherein:
the first thin film transistor includes a first gate electrode connected to the gate line, a first semiconductor disposed on the first gate electrode, and a first source electrode and a first drain electrode disposed on the first semiconductor,
the second thin film transistor includes a second gate electrode connected to the gate line, a second semiconductor disposed on the second gate electrode, and a second source electrode and a second drain electrode disposed on the second semiconductor, and
the third thin film transistor includes a third gate electrode connected to the first voltage line, a third semiconductor disposed on the third gate electrode, and a third source electrode and a third drain electrode disposed on the third semiconductor.

10. The liquid crystal display of claim 9, wherein:
the first source electrode is connected to the data line and the first drain electrode is connected to the first subpixel electrode.

11. The liquid crystal display of claim 9, wherein:
the second source electrode is connected to the data line, and the second drain electrode is connected to the third source electrode.

12. The liquid crystal display of claim 9, wherein:
the third source electrode is connected to the second drain electrode, and the third drain electrode is connected to the second subpixel electrode.

13. The liquid crystal display of claim 9, wherein:
a channel size of the second thin film transistor is the same as a channel size of the third thin film transistor.

14. The liquid crystal display of claim 1, further comprising:
a shielding electrode overlapping the data line.

15. The liquid crystal display of claim 14, wherein:
the shielding electrode is disposed in the same layer as the first subpixel electrode and the second subpixel electrode.

16. The liquid crystal display of claim 15, further comprising:
a connection electrode connecting the adjacent shielding electrodes to each other.

* * * * *